:# 2,856,332
RECOVERY OF ALDEHYDES

Joseph K. Mertzweiller, Baton Rouge, La., assignor to Esso Research and Engineering Company, a corporation of Delaware No Drawing. Application April 19, 1951
Serial No. 221,943

3 Claims. (Cl. 202—61)

This invention relates to the recovery of aldehydes from aldehyde-containing, crude, aldehydic reaction products obtained by the reaction between carbon monoxide, hydrogen and organic unsaturated compounds containing an olefinic unsaturation at an elevated temperature in the presence of a cobalt-containing catalyst.

The crude aldehydes, to the purification of which the present invention is directed, comprise the aldehydic reaction products obtained by the reaction between carbon monoxide, hydrogen and organic unsaturated compounds containing an olefinic unsaturation in the presence of a cobalt-containing catalyst. The aldehydic reaction products thus obtained consist of a complex mixture containing aldehydes in admixture with organic oxygen-containing reaction by-products such as ketones, alcohols, acids, etc., as well as some high boiling organic materials. Subjection of the reaction products to hydrogenation conditions converting aldehydes to alcohols provides a valuable source of highly desirable alcohols.

Utilization of the synthetic crude aldehydic reaction products as a source of aldehydes has been seriously handicapped, however, by inability to effect the efficient practical scale recovery therefrom of the aldehydes as such in a high state of purity. Subjection of the complex mixture of crude aldehydic reaction products to such practical scale separating means as simple distillation, fractionation, and the like, not only results in an aldehyde product which is lacking in a sufficient degree of purity, but it generally entails the loss of considerable proportions of the aldehydes originally present. Since the ability to utilize the aldehydes efficiently as a starting or intermediate material in many fields of application is dependent upon the substantial absence therein of contaminant materials, even in relatively small amounts, means enabling the separation of the aldehydes from the crude synthetic aldehydic reaction products in a high state of purity are of the utmost importance. Thus, the efficiency with which the aldehyde content of the crude mixture can be converted to the corresponding alcohols is dependent to at least a substantial degree upon the purity of the aldehydic product subjected to the hydrogenating conditions. Because of the impracticability of separating the aldehydes with any degree of efficiency in a high state of purity by such means as distillation, fractionation, and the like, research workers heretofore have resorted to the separation of desired aldehydes from the crude synthetic product by chemical processes wherein the adlehydes are first converted to compounds which are more easily separated from the mixture, and after their separation the compounds are again converted to the aldehyde. Thus, aldehydes of high purity are obtained by first converting the aldehydes to alcohols and thereafter converting the purified alcohols to the aldehyde form. Such methods are, however, highly impractical, not only because of the complexity and cost of operative steps involved but because of the considerable loss of aldehydes that is unavoidably occasioned thereby.

It is an object of the present invention to provide an improved process enabling the more efficient recovery of aldehydes in a high state of purity from reaction products obtained by the reaction between carbon monoxide, hydrogen, and an organic unsaturated compound containing an olefinic unsaturation at an elevated temperature in the presence of a cobalt-containing catalyst. A more particular object of the invention is the provision of an improved process enabling the more efficient recovery of aliphatic aldehydes contained in reaction products obtained by the reaction between carbon monoxide, hydrogen, and an olefinic hydrocarbon, in the presence of a cobalt catalyst. Other objects and advantages of the invention will become apparent from the following detailed description thereof.

In accordance with the process of the invention, aldehydes present in crude, aldehydic reaction products obtained by the reaction between carbon monoxide, hydrogen and an organic unsaturated compound containing an olefinic unsaturation, are recovered with substantially improved efficiency, by heating the crude, aldehydic reaction products at a temperature in the range of from about 175° to about 360° F. and a pressure of from about 15 p. s. i. to 60 atmospheres, in the presence of an added gas which is free of any substantial amount of carbon monoxide and inert under the treating conditions, and thereafter separating aldehydes from the crude aldehydic mixture by distillation. In a preferred method of carrying out the invention, hydrogen, or a hydrogen-containing gas, which is free of any substantial amount of carbon monoxide, is employed as the added gas within the prescribed temperature range under conditions avoiding any substantial aldehyde hydrogenation.

The purpose of this invention is to disclose an improved process for the separation of aldehydes from the synthetic mixtures obtained by treating olefins with carbon monoxide and hydrogen at elevated pressures and temperatures in the presence of a suitable carbonylation catalyst. More specifically, the carbonylation reaction is carried out under conventional conditions, e. g., with cobalt or iron catalysts at temperatures in the range of 250°–400° F., pressures in the range of 2000–5000 p. s. i. g. of synthesis gas having $H_2/CO$ ratios in the range of 0.5–2.0/1. The product from the carbonylation stage contains dissolved metal carbonyls in concentrations of 0.1–1.0 wt. percent; this aldehydic product is treated by heating at temperatures in the range of 175°–360° F., in the presence of an inert gaseous medium free of substantial quantities of carbon monoxide and at pressures in the range of 1–60 atmospheres. The gaseous medium is substantially inert under these treating conditions, and the function of such a treatment is to reduce the cobalt content to 0.002–0.005% and less. The treated products are subjected to distillation for recovery of the aldehydes which are obtained in purities proportional to the efficiency of the distillation operation. Techniques such as vacuum distillation, steam distillation, azeotropic distillation or extractive distillation may be employed. Conditions and additives inhibiting hydrogenation under carbonylation conditions may be employed.

Thus, it may be desirable to employ and include in the olefin feed a small amount, in the range of from 0.01 to 1.0% based on the olefin feed, of hydrogenation inhibitors such as carbon di-sulfide or sodium methylate. These additives serve to decrease the tendency of aldehydes to become hydrogenated during the initial carbonylation reaction.

The crude aldehydes, to the purification of which the present invention is directed, comprise broadly the aldehydic reaction products obtained in the known manner by the reaction between carbon monoxide, hydrogen and an organic unsaturated compound having an olefinic unsaturation, at an elevated temperature in the presence of a cobalt-containing catalyst. Examples of unsaturated organic compounds employed in the production of such crude aldehydic reaction products comprise the olefinic hydrocarbon, as propylene, butylenes, pentenes, hexenes, heptenes, octenes, nonenes, decenes and their homologues, and analogues, etc. The aldehydes contained in the crude aldehydic reaction products will comprise aldehydes having one more carbon atom to the molecule than the organic unsaturated compound reacted with the carbon monoxide and hydrogen. Thus, when reacting carbon monoxide, hydrogen and an olefin, such as, for example, heptene, the aldehydic product will comprise the corresponding aliphatic aldehydes having eight carbon atoms to the molecule.

The crude aldehydic reaction products contain, in addition to the oxygen-containing reaction by-products, a substantial amount of complex cobalt compounds comprising, for example, cobalt carbonyls, formed during the interaction of the carbon monoxide, hydrogen and unsaturated compounds. These complexes entrained with, and/or dissolved in, the crude aldehydic reaction products, are not only highly volatile in nature, causing them to pass overhead during subsequent distillation of the crude aldehydic reaction products as such but are believed to contribute materially to the substantial loss of aldehydes suffered during such distillation by promoting or catalyzing, the condensation of the aldehydes to high boiling material. It has been found that cobalt complexes, in the form in which they are encountered in the crude aldehyde, will exert these detrimental effects and prevent any efficient recovery of aldehydes by distillation therefrom even when their concentration is as low as about 0.01% based on cobalt. The following is illustrative of the substantial loss of aldehydes encountered and impurity of product obtained, when attempting to recover aldehydes from the crude aldehydic reaction products by subjecting them as such to distillation, according to the published art.

A crude aldehydic reaction product, obtained by reacting a hexene fraction with carbon monoxide and hydrogen in the presence of a cobalt catalyst, which contained 46% of $C_7$ aldehydes, had a specific gravity of 0.792 and had cobalt content of 0.203% was distilled at a reduced pressure of 13 to 17 mm. in a nitrogen atmosphere. Only 74% of the aldehydes present in the charge were recovered in the distillate which was of a yellow color (boiling range: 26–51° C. at 13 mm.). In spite of the short duration of the distillation (one hour) and a relatively low bottom temperature, it was found that 25% of the aldehydes in the charge were condensed to high boiling material. 29% of the cobalt complexes originally present in the charge passed overhead during distillation, the remainder was found in the still residue.

It is apparent from the foregoing example that relatively rapid distillation of the crude aldehyde results in a considerable loss of the aldehyde to condensation. Attempts to effect a more precise fractionation of the product results in a still greater loss.

Treatment of the crude aldehyde in accordance with the invention obviates substantially completely the difficulties attributable to at least a substantial degree to the presence of cobalt complexes of the form in which they are present in the crude aldehydic reaction products. Without intent to limit the scope of the invention by any theory advanced herein to set forth more fully its nature, it is believed that the pretreatment under the conditions of the present invention converts the cobalt complexes from the volatile and highly active form in which they are found in the crude aldehydic reaction products, to a relatively involatile and inactive cobalt-containing material incapable of promoting or catalyzing the aldehyde condensaiton reaction. The pretreatment prior to distillation makes possible the recovery of the aldehydes from the crude mixture by practical scale distillation means in the absence of any substantial amount of aldehyde condensation or cobalt carry-over. It has furthermore been found that the effect of the pretreatment of the crude aldehyde renders the cobalt-containing impurity particularly inocuous when the subsequent distillation is effected under vacuum.

Heating of the crude aldehyde prior to distillation in accordance with the invention is effected at a temperature in the range of, for example, from about 175° to about 360° F. The heat treatment is effected in the presence of an added gaseous medium which is free of any substantial amount of carbon monoxide and which is relatively inert under the conditions of execution of the treatment. Suitable gaseous media comprise, for example, nitrogen, hydrogen, steam, the normally gaseous paraffins, etc. Heating in the presence of the gaseous medium in the prescribed temperature range is executed at a superatmospheric pressure not substantially in excess of about 60 atmospheres and preferably in the range of from about 25 to about 50 atmospheres. In a preferred method of carrying out the invention, the pretreatment is effected in the presence of hydrogen as the added gaseous medium at conditions within the prescribed range precluding any substantial hydrogenation of the aldehydes.

The duration of the heating step may vary within the scope of the invention and is dependent to some degree upon the composition of the crude aldehyde and upon the degree of aldehyde recovery and absence of cobalt in the aldehydic product which is desired. In general, heating times of from 30 minutes to about two hours have been found satisfactory. Lesser or longer preheating time may be resorted to, however, within the scope of the invention.

After thus heating the crude aldehydic reaction products under the prescribed conditions they are subjected to distillation to effect the separation of aldehydes therefrom. It has been found that the crude aldehyde which has been pretreated in accordance with the invention can be subjected to distillation to effect the substantially complete separation of aldehydes therefrom, not only in the absence of any cobalt carry-over, but in the absence of any substantial condensation of the aldehydes.

The crude aldehyde need not be freed of entrained catalyst or complexes thereof often found in considerable amount in a suspended or precipitated state in the products of the reaction between carbon monoxide, hydrogen and an unsaturated compound carried out in the presence of a cobalt catalyst. Whereas subjection of such material to distillation will result in volatilization of the cobalt-containing materials and the formation of deposits upon the walls of the distillation apparatus and subsequent parts of equipment, the pretreatment of the crude aldehyde in accordance with the invention will result in the substantially complete elimination of these difficulties and with the maintaining of substantially all cobalt and compounds thereof in the still residue in the absence of any substantial aldehyde condensation.

A particular advantage of the invention resides in enabling the subjection of the pretreated crude aldehyde not only to a single distillation step but to the relatively severe distillation conditions often involving a plurality of distillation steps often necessary to obtain a product consisting essentially of a single aldehyde, without a substantial loss of aldehydes due to condensation reactions. Resort to such more severe distillation conditions are found necessary, for example, when the crude aldehydic product is obtained by the reaction of a plurality of unsaturated compounds with the carbon monoxide and hydrogen. Thus, when a wide boiling olefinic fraction is employed as such unsaturated compounds the crude aldehydic products obtained will contain not only a plurality of aldehydes but also, a smaller amount of a plurality of oxygen-containing reaction by-products boiling over a wide range and overlapping the boiling temperatures of the aldehydes.

The following examples serve to illustrate the procedure involved in this invention.

Example I

A sample of $C_7$ olefin obtained by distillation of product from polymerization of propylene-butylene mixtures over solid phosphoric acid in a commercial plant was reacted with carbon monoxide and hydrogen by passing downflow and countercurrent to the synthesis gas through a reactor having an inside diameter of 30 mm. and containing about 300 cc. of liquid. The olefin feed containing 2.4 wt. percent cobalt naphthenate catalyst was pumped into the reactor at a rate of 300 cc./hr. The temperature was maintained at 350° F. and the pressure at 3000 p. s. i. g. of synthesis gas having an $H_2/CO$ ratio of 1.16/1. Liquid effluent was withdrawn from the bottom of the reactor to maintain a constant liquid level and the effluent product cooled and gaseous and liquid phases separated in a high pressure separator. The exit gases from the high pressure separator amounted to about 5000 cu. ft./barrel of liquid. The liquid product was reduced in pressure and passed continuously with a stream of hydrogen containing less than 1% carbon monoxide, through a steam preheater and into a soaking vessel having a capacity of about 300 cc. In the soaking vessel the temperature was maintained at an average of 340° F. and the pressure at an average of 400 p. s. i. g. Liquid and gas were withdrawn by overflow from the soaking vessel passed through a cooler and into a gas-liquid separator. Gas containing about 23% carbon monoxide was withdrawn from the separator at a rate of 330–345 cu. ft./barrel of liquid. The liquid was reduced in pressure and collected in a chilled accumulator. The effect of such treatment is to effect a substantial reduction in soluble cobalt content as shown in the following examples.

| Run No. | Temp., °F. | Feed Cobalt, Wt. Percent | Treated Product, Cobalt, Wt. Percent |
| --- | --- | --- | --- |
| A | 344 | 0.13 | 0.002–0.005 |
| B | 331–336 | 0.09 | 0.003–0.005 |
| C | 333–334 | 0.10 | 0.002 |

A charge of 1250 grams of the product was distilled under vacuum in a Claisen apparatus, the unconverted hydrocarbon being removed at a pressure of 7 mm. and collected in a Dry Ice trap. The pressure was then reduced to 3 mm. and an aldehyde rich fraction collected between 80 and 150° F. The unconverted hydrocarbon amounted to 14.4 wt. percent of the charge and the aldehyde fraction to 56.6 wt. percent of the charge, the remainder being higher boiling products. The aldehyde fraction was water white and contained about 58% $C_8$ aldehyde.

Example II

Commercial di-isobutylene was reacted with carbon monoxide and hydrogen by passing downflow and countercurrent to the synthesis gas through an oxonation reactor having an inside diameter of 30 mm. and containing about 300 cc. of liquid. The olefin contained 1.7 wt. percent cobalt naphthenate catalyst and was pumped into the reactor at a rate of about 300 cc./hr. The temperature was maintained at an average of 350° F. and the pressure at 3000–3050 p. s. i. g. with synthesis gas having an $H_2/CO$ ratio of 1.1/1. Liquid effluent was withdrawn from the bottom of the reactor to maintain a constant level and the effluent product cooled and gaseous and liquid phases separated in a high pressure separator. The exit gases from the high pressure separator amounted to 3200–4300 cu. ft./barrel of liquid. The liquid product was reduced in pressure and passed, continuously with a stream of hydrogen essentially free of carbon monoxide, through a steam preheater and into a soaking vessel having a capacity of about 300 cc. In the soaking vessel the temperature was maintained at an average of 328°–336° F. and the pressure at an average of 400 p. s. i. g. Liquid and gas were withdrawn by overflow from the soaking vessel and passed through a cooler and into a gas-liquid separator. Gas containing 7–19% carbon monoxide was withdrawn from the separator at a rate of 260–310 cu. ft./barrel of liquid. The liquid was reduced in pressure and collected in a chilled accumulator.

A charge of 1209 grams of the product was distilled in a vacuum Claisen apparatus, the unconverted hydrocarbon being collected in a Dry Ice trap. An aldehyde rich fraction was collected at 85°–150° F. at a pressure of 2 mm. The unconverted hydrocarbon amounted to 25.4 wt. percent of the charge and the aldehyde rich fraction was 54.1% of the charge. The aldehyde fraction was water white and contained about 70% $C_9$ aldehyde.

To determine what temperatures may be employed in the pretreating step prior to the aldehyde distillation without causing aldehyde product degradation and losses, by formation of secondary reaction products, polymers, aldols, etc., a series of determinations were carried out wherein the preconditioning temperatures were varied widely. Though all the aldehyde products were derived from a refinery heptene stream resulting from the catalytic polymerization of $C_3$ and $C_4$ olefins, the aldehyde products differed among themselves in terms of residence time in the aldehyde synthesis reactor and other reaction conditions. Accordingly, the results were evaluated in terms of iso-octyl alcohol recoverable prior to decobalting and after decobalting. This test procedure was carried out by subjecting one portion of the cobalt-containing aldehyde product as withdrawn from the aldehyde synthesis stage directly to a bomb-hydrogenation reaction in the presence of an excess of an active nickel catalyst. The bomb-hydrogenation conditions included reaction conditions as follows:

Temperature_____ 325°–375° F.
Pressure_____ 2500–3500 p. s. i. g.
Catalyst_____ Nickel (65%) on kieselguhr ca. 10–20% on feed.
Time_____ 10–12 hours.

A second portion of the same product was treated with hydrogen under non-hydrogenation (i. e. decobalting) conditions to remove cobalt, and then hydrogenated. Where the amount of iso-octyl alcohol product obtained after decobalting was significantly less than the amount obtained after hydrogenation without prior decobalting, this would indicate losses due to polymerization, condensation, etc. of aldehyde product.

| Run | A | B | C | D |
| --- | --- | --- | --- | --- |
| Pretreater temp. | 259 | 308 | 323 | 320–336 |
| Pressure, p. s. i. g. | 100 | 95 | 100 | 305 |
| Cobalt, Wt. Percent: | | | | |
| Before removal | 0.087 | 0.058 | 0.181 | 0.250 |
| After removal | 0.003 | 0.003 | 0.001 | 0.045 |
| Selectivity to iso-octyl alcohol, mol. percent: | | | | |
| No decobalting | 80 | 70 | 79 | 80 |
| After decobalting | 80 | 70 | 78 | 80 |

The decobalted samples all were hydrogenated over a nickel on kieselguhr catalyst at temperatures of about 325° to 375° F., pressures of 2500 to 3500 p. s. i. g., and for 10–12 hours.

These results show that decobalting or pretreating the aldehyde product to remove cobalt may be carried out over a wide pressure and temperature range without causing aldehyde losses, or losses in resulting alcohols, due to the formation of secondary reaction products.

What is claimed is:

1. The process for recovery of aliphatic aldehydes having a high state of purity from crude aldehydic reaction products obtained by the interaction in a reaction zone of carbon monoxide, hydrogen and an olefin hydrocarbon having 3 to 10 carbon atoms per molecule at an elevated temperature and pressure in the presence of a cobalt catalyst, said crude aldehydic reaction products comprising unreacted gases, dissolved cobalt carbonyl and unconverted olefin hydrocarbon impurities, which comprises the steps of withdrawing the crude aldehydic products from the reaction zone, cooling said withdrawn products and passing the crude products into a high pressure separation zone, separating a gaseous phase from a liquid phase in the high pressure separation zone, passing the separated liquid phase from the high pressure separation zone under a reduced pressure through a preheating zone with an admixed stream of hydrogen free of carbon monoxide into a soaking zone, maintaining a temperature at an average of 328° to 340° F. and a pressure of about 400 p. s. i. g. in the soaking zone wherein the cobalt carbonyl is decomposed, withdrawing liquid and gas from the soaking zone through a cooling zone into a gas-liquid separation zone, removing gas from said second separation zone, collecting the liquid from the second separation zone at reduced pressure in a chilled accumulation zone, thereafter subjecting the liquid thus collected in the accumulation zone to distillation under vacuum to remove unconverted hydrocarbon from the aldehyde liquid, then to further distillation under vacuum to obtain a desired aliphatic aldehyde distillate fraction.

2. The process in accordance with claim 1, in which the olefin reacted with carbon monoxide and hydrogen in the reaction zone is a $C_7$ olefin, the temperature in the soaking zone is an average of 340° F., the absolute pressure in the vacuum distillation is 7 mm. mercury to remove unconverted hydrocarbon and is then 3 mm. mercury in distilling the aldehyde fraction boiling in the range of 80° to 150° F.

3. The process according to claim 1, the olefin is a $C_8$ olefin, the temperature in the soaking zone is in the range of 328° to 336° F.

References Cited in the file of this patent

UNITED STATES PATENTS

| | | |
|---|---|---|
| 2,414,276 | Sensel et al. | Jan. 14, 1947 |
| 2,440,109 | Moore | Apr. 20, 1948 |
| 2,514,961 | Max | July 11, 1950 |
| 2,560,360 | Mertzweiller et al. | July 10, 1951 |
| 2,595,096 | Parker | Apr. 29, 1952 |

FOREIGN PATENTS

| | | |
|---|---|---|
| 488,711 | Belgium | May 16, 1949 |
| 452,450 | Italy | Oct. 22, 1949 |
| 7,671 | Union of South Africa | Oct. 24, 1949 |